3,535,306
MONOAZO DYES OF LOW SOLUBILITY HAVING A DIPHENYLAMINE GROUP

Ruedi Altermatt, Tecknau, Basel-Land, and Heinz Wicki, Allschwil, Basel-Land, Switzerland, assignors to Sandoz Ltd. (also known as Sandoz A.G.), Basel, Switzerland
No Drawing. Filed June 2, 1967, Ser. No. 643,039
Claims priority, application Switzerland, June 6, 1966, 8,143/66; July 12, 1966, 10,121/66
Int. Cl. C09b 29/06, 29/08, 43/00
U.S. Cl. 260—207.1         7 Claims

ABSTRACT OF THE DISCLOSURE

Disperse dyes having the formula

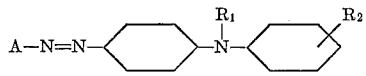

where A stands for an aryl radical, $R_1$ for hydrogen or an optionally substituted alkyl and $R_2$ for a negative substituent, and where the molecule may bear further substituents; their production and, which are highly suitable for the dyeing of fibres and fibre materials of fully synthetic and semi-synthetic, high molecular organic substances of hydrophobic character, especially linear aromatic polyesters, cellulose acetates and polyamides.

---

This invention relates to dyes which have low solubility in water and are of the formula

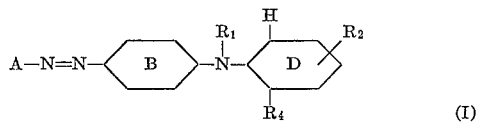

where A stands for the radical of a diazo component of the benzene or naphthalene series which is free from metallisable groups, $R_1$ for a hydrogen atom or an optionally substituted alkyl radical, $R_2$ for a halogen atom, a cyano, nitro or trifluoromethyl group, an acyl or acyloxy radical, or an optionally substituted carboxylic acid amide or sulphonic acid amid radical, and $R_4$ for a hydrogen or halogen atom, an alkyl, alkoxy or acylamino radical, and where the rings B and D may be further substituted and the molecule bears no phenolic hydroxyl, carboxylic acid or sulphonic acid groups.

The process for their production consists in diazotising an amine of formula $$A\text{—}NH_2 \quad (II)$$

and coupling the diazo compound with a compound of formula

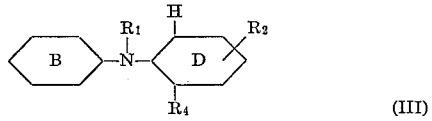

The preferred dyes of this invention conform to the formula

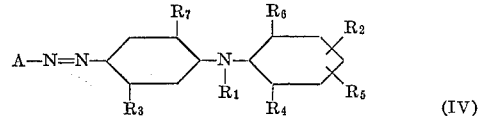

where $R_1$ and A have one of the aforestated meanings, $R_2$ represents a halogen atom, a cyano, nitro or trifluoromethyl group, an acyl or acyloxy group, or a carboxylic acid amide or sulphonic acid amide which may be further substituted, $R_3$ represents a hydrogen or halogen atom, a cyano or nitro group or an alkyl, alkoxy or acylamino radical, $R_4$ represents a hydrogen or halogen atom or an alkyl, alkoxy or acylamino radical, $R_5$ represents a hydrogen or halogen atom, a cyano or nitro group or an alkyl, alkoxy, acyl, acylamino, carboxylic acid amide or sulphonic acid amide radical, $R_6$ is a hydrogen atom, and $R_7$ represents a hydrogen or halogen atom, or an alkyl or alkoxy radical, and where the molecule may bear further substituents with the exception of carboxylic acid and sulphonic acid groups.

These preferred dyes are produced by diazotising an amine of Formula II and coupling the diazo compound with a compound of formula

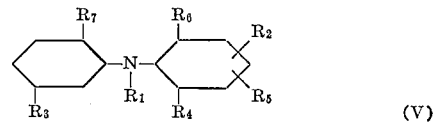

All the alkyl and alkoxy radicals present contain preferably not more than 4 carbon atoms. The preferred acyl radicals are alkylcarbonyl, alkoxycarbonyl, aralkoxycarbonyl, aryloxycarbonyl and alkylsulphonyl radicals. Alkyl or phenyl radicals, which may be substituted if desired, are the preferred substituents on the carboxylic acid amide and sulphonic acid amide groups. Halogen denotes preferably chlorine or bromine. The diazo components of the present definition A include aminoazo compounds. Examples of suitable diazo components are aminobenzenes, aminonaphthalenes, aminoazobenzenes, aminoazonaphthalenes and phenylazoaminonaphthalenes. With the exception of the hydroxyl group, the diazo components may contain any of the substituents commonly employed in the chemistry or disperse dyes, e.g. halogen atoms, nitro, cyano, formyl, trifluoromethyl or thiocyano groups, alkyl, alkoxy, acyl, unsubstituted, monosubstituted or disubstituted carboxylic acid amide or sulphonic acid amide, alkylcarbonylamino or arylcarbonylamino radicals, of which the alkyl and aryl radicals may bear further substituents. The following may be enumerated as examples of suitable diazo components:

1-amino-2-chloro-4-nitrobenzene, 1 - amino-4-chloro-2-nitrobenzene, 1 - amino - 2,6-dichloro-4-nitrobenzene, 1-amino-2,5-dichloro - 4 - nitrobenzene, 1 - amino-2,4,6-trichlorobenzene, 1 - amino - 2,3,4,6-tetrachlorobenzene, 1-amino-2-bromo-4-nitrobenzene, 1 - amino-2,6-dibromo-4-nitrobenzene, 3- or 4-acetyl-1-aminobenzene, 1-amino-6-chloro-2,4-dinitrobenzene, 1 - amino-6-bromo-2,4-dinitrobenzene, 2-amino-3-chloro-5-nitrobenzonitrile, 4-amino-3-bromo-5-chloro - 1 - methylsulphonylbenzene, 4-amino-3,5-dichlorobenzonitrile, 2 - amino-3-bromo-5-nitrobenzonitrile, 2-amino-5-nitrobenzonitrile, 2-amino-3,5-dinitrobenzonitrile, 1-amino-4-nitrobenzene, 1-amino-2,4-dinitrobenzene, 2 - amino-3,5-dinitro-1-methylsulphonylbenzene, 2-amino-3-chloro-5-nitro - 1 - methylsulphonylbenzene, 1-amino-3,4-dichlorobenzene, 1-amino-4-chlorobenzene, 1-amino-4-bromobenzene, 4 - amino-3-cyano - 1 - methylsulphonylbenzene, 4-amino - 1 - methylsulphonylbenzene, 1-amino-3-dimethylaminosulphonylaminobenzene, 1-amino-4-dimethylaminosulphonylbenzene, 1 - amino - 3 - diethylaminosulphonylaminobenzene, 1 - amino-4-diethylaminosulphonylaminobenzene, 1 - amino-4-aminosulphonylbenzene, 4-amino - 3 - chloro - 1 - methylsulphonylbenzene, 1-amino-4-aminosulphonyl - 2 - chlorobenzene, 1 - amino-2-chloro-4-methylaminosulphonylbenzene, 1 - amino-2-chloro-4-dimethylaminosulphonylbenzene, 1-amino-2-cyano-4-chlorobenzene, 1-amino-4-nitro-2-trifluoromethylbenzene, 1-amino-4-aminocarbonylbenzene, 1-amino-4-methylaminocarbonylbenzene, 1 - amino-2- chloro-4-methylaminocarbonylbenzene, 1 - amino - 2 - chloro-4-dimethylaminocarbonylbenzene, 1-amino-4-methylsulphonylnaphthalene, 1-aminonaphthalene-4-sulphonic acid amide, 1 - aminonaphthalene-4-sulphonic acid methylamide, 4-amino-1,1'-azobenzene, 4-amino-4'-chloro-1,1'-azobenzene or 4-amino-2'-chloro-4'-cyano-1,1'-azobenzene, 1-amino-2-bromo-4-nitro-6-chlorobenzene, 1-amino-2,6-dichloro-4-dimethylaminosulphonylbenzene.

The following are examples of preferred coupling components:

N-(4'-chlorophenyl)-aminobenzene,
N-(4'-nitrophenyl)-aminobenzene,
N-(4'-cyanophenyl)-aminobenzene,
N-(4'-trifluoromethylphenyl)-aminobenzene,
N-(4'-acetylphenyl)-aminobenzene,
N-(4'-methylsulphonylphenyl)-aminobenzene,
N-(4'-methoxycarbonylphenyl)-aminobenzene,
N-(4'-aminocarbonylphenyl)-aminobenzene,
N-(4'-aminosulphonylphenyl)-aminobenzene,
N-(4'-methylaminocarbonylphenyl)-aminobenzene,
N-(4'-ethylsulphonylphenyl)-aminobenzene,
N-(2'-chloro-4'-methylsulphonylphenyl)-aminobenzene,
N-(2'-methyl-4'-methylsulphonylphenyl)-aminobenzene,
N-(2'-methoxy-4'-methylsulphonylphenyl)-aminobenzene,
N-(2'-acetylamino-4'-methylsulphonyl-phenyl)-aminobenzene,
N-(2'-methoxycarbonylamino-4'-methylsulphonyl-phenyl)-aminobenzene,
N-(2'-benzyloxycarbonylamino-4'-methylsulphonyl-phenyl)-aminobenzene,
N-(2'-methylsulphonylamino-4'-methylsulphonyl-phenyl)-aminobenzene,
N-(2'-phenyl-sulphonylamino-4'-methylsulphonyl-phenyl)-aminobenzene,
N-(3'-methoxy-4'-methylsulphonyl-phenyl)-aminobenzene,
N-(4'-nitro-3'-methylsulphonyl-phenyl)-aminobenzene,
N-(3'-acetylamino-4-methylsulphonylphenyl)-aminobenzene,
N-(3'-methoxycarbonyl-4'-methylsulphonylphenyl)-aminobenzene,
N-(4'-chloro-5'-aminosulphonylphenyl)-aminobenzene,
N-(4'-chloro-5'-aminocarbonylphenyl)-aminobenzene,
N-(3'-methoxycarbonyl-4'-methylsulphonylphenyl)-aminobenzene,
N-(4'-chloro-5'-aminosulphonylphenyl)-aminobenzene,
N-(4'-chloro-5'-aminocarbonylphenyl)-aminobenzene,
N-(3'-methoxycarbonylamino-4'-methylsulphonyl-phenyl)-aminobenzene,
N-(2'-phenyloxycarbonylamino-4'-methylsulphonyl-phenyl)-aminobenzene,
N-(2'-acetylamino-4'-chlorophenyl)-aminobenzene,
N-(2'-propionylamino-4'-chlorophenyl)-aminobenzene,
N-(2'-acetylamino-4'-cyanophenyl)-aminobenzene,
N-(2'-acetylamino-4'-nitrophenyl)-aminobenzene,
N-(2'-propionylamino-4'-nitrophenyl)-aminobenzene,
N-(2'-butyrylamino-4'-nitrophenyl)-aminobenzene,
N-(2'-acetylamino-4'-methoxycarbonylphenyl)-aminobenzene,
N-(2'-acetylamino-4'-ethoxycarbonylphenyl)-aminobenzene,
N-(2'-acetylamino-4'-aminosulphonyl-phenyl)-aminobenzene,
N-(2'-butyrylamino-4'-methylsulphonylphenyl)-aminobenzene,
N-(2'-acetylamino-4'-methylaminocarbonylphenyl)-aminobenzene,
N-(2'-acetylamino-4'-ethylsulfonylphenyl)-aminobenzene,
N-(4'-nitrophenyl)-3-methyl-1-aminobenzene,
N-(4'-nitrophenyl)-3-methoxy-1-aminobenzene,
N-(4'-nitrophenyl)-N-(β-hydroxyethyl)-1-aminobenzene,
N-(4'-nitrophenyl)-N-(β-cyanethyl)-1-aminobenzene,
N-(4'-nitrophenyl)-N-(β-acetoxyethyl)-1-aminobenzene,
N-(4'-chlorophenyl)-2-methoxy-5-acetylamino-1-aminobenzene.

The dyes especially preferred are of the formula

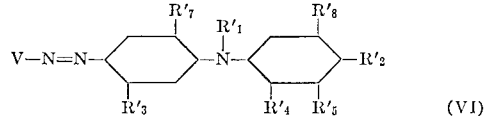

(VI)

where V— has the formula

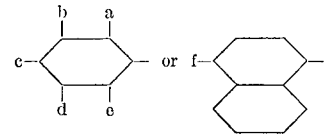

and $R'_1$ stands for hydrogen, an alkyl radical which has 1–4 carbon atoms and may be substituted by a hydroxyl group, a chlorethyl, cyanethyl, formyloxyethyl, acetoxyethyl, propionyloxyethyl, methoxycarbonylethyl, methoxycarbonyloxyethyl or ethoxycarbonyloxyethyl group, $R'_2$ for a hydrogen, chlorine or bromine atom, a cyano, trifluoromethyl, nitro, acetyl, acetoxy, methoxycarbonyl, ethoxycarbonyl, aminocarbonyl, methylaminocarbonyl, ethylaminocarbonyl, dimethylaminocarbonyl, diethylaminocarbonyl, methoxycarbonyloxy, ethoxycarbonyloxy, propoxycarbonyloxy, methoxypropylaminocarbonyl, methylsulphnyl, chloromethylsulphonyl, ethylsulphonyl, phenylsulphonyl, cyanomethylsulphonyl, hydroxyethylsulphonyl, aminosulphonyl, methylaminosulphonyl, dimethylaminosulphonyl, ethylaminosulphonyl, diethylaminosulphonyl, phenylaminosulphonyl or methoxypropylaminosulphonyl group, $R'_3$ for a hydrogen, chlorine or bromine atom, a cyano, nitro, methyl, methoxy, acetylamino, chloracetylamino, propionylamino, methoxycarbonylamino or ethoxycarbonylamino group, $R'_4$ for a hydrogen, chlorine or bromine atom, a methyl, methoxy, formylamino, acetylamino, propionylamino, butyrylamino, valeroylamino, chloracetylamino, chloropropionylamino, methoxycarbonylamino, ethoxycarbonylamino, chloromethoxycarbonylamino or chlorethoxycarbonylamino group, $R'_5$ for a hydrogen, chlorine or bromine atom, a cyano, nitro, methyl, methoxy, ethoxy acetylamino, methoxycarbonyl, ethoxycarbonyl, methoxycarbonyloxy or ethoxycarbonyloxy group, $R'_7$ for a hydrogen, chlorine or bromine atom, a methoxy or ethoxy group, $R'_8$ for a hydrogen, chlorine or bromine atom or a methoxy group, a for a hydrogen, chlorine or bromine atom, a cyano, nitro, trifluoromethyl, methoxy, methoxycarbonyl or methylsulphonyl group, b for a hydrogen or chlorine atom or a methyl or methoxy group, c for a hydrogen or chlorine atom, a cyano, thiocyano, nitro, formyl, acetyl, methylsulphonyl, cyanomethylsulphonyl, aminosulphonyl, methylaminosulphonyl, dimethylaminosulphonyl, ethylaminosulphonyl, diethylaminosulphonyl, acetylamino, phenylazo, 2-chlorophenylazo, 4-chlorophenylazo or 4-hydroxyphenylazo group, d for a hydrogen or chlorine atom or a cyano, methoxy or methylsulphonyl group, e for a hydrogen, chlorine or bromine atom, and f for a 4-nitrophenylazo, methylsulphonyl or aminosulphonyl group, with the proviso that $R'_2$, $R'_5$ and $R'_8$ may not each and at the same time signify a hydrogen atom.

To produce these dyes, an amine of formula $$V\text{---}NH_2 \qquad (VII)$$

is diazotised and the diazo component coupled with a compound of formula

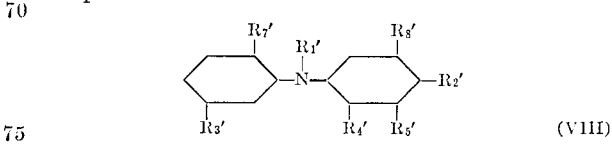

(VIII)

Dyes of Formulae I, IV and VI can alternatively be produced by condensing an azo compound of formula

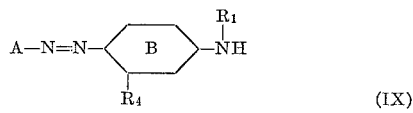
(IX)

where A, B and $R_1$ each have one of the meanings assigned to them in the foregoing, with a compound of formula

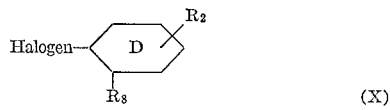
(X)

where $R_2$ has one of the aforecited meanings and $R_8$ stands for a substituent, preferably the nitrogen group, which activates the adjacent halogen atom, after which $R_8$ is converted into $R_4$.

The reaction of compounds of Formulae IX and X is effected by one of the known methods, e.g. in polyethylene glycol in the presence of an alkaline condensation agent, e.g. magnesium oxide or calcium carbonate. In general, the coupling reaction is carried out in an acid, if necessary buffered medium with cooling, e.g. at temperatures of 0° to 5° C.

The new products thus obtained are excellent disperse dyes. It is of special advantage to convert the new dyes into dye preparations by one of the known methods prior to use. For this purpose they are comminuted to an average particle size of approximately 0.01 to 10 microns, or more particularly 0.1 to 5 microns. Comminution can be carried out in the presence of dispersants and/or fillers. For example, the dried dye can be ground with a dispersant, if necessary in the presence of fillers, or it can be kneaded in paste form with a dispersant and subsequently vacuum or jet dried. After the addition of an appropriate volume of water, these preparations can be employed for dyeing, padding or printing from long or short baths. For dyeing from long baths amounts of up to 20 grams per litre are generally used, for padding up to about 150 grams or preferably 0.1 to 100 grams per litre, and for printing up to about 150 grams per 1000 grams of printing paste. The liquor ratio may vary within wide limits, for example from about 1:30 to 1:200 or preferably from 1:3 to 1:80.

From aqueous dispersion the dyes build up excellently on shaped materials of fully synthetic and semisynthetic, high-molecular organic substances of hydrophobia character. They are specially suitable for the dyeing, padding and printing of linear aromatic polyesters, cellulose diacetate and cellulose triacetate in the form of loose fibre, yarn, woven piece goods and knitted fabrics. In addition, they can be applied to polyamide, polyolefin, polyacrylonitrile and polyvinyl chloride fibres. Dyeings of particularly high quality are obtained on linear aromatic polyesters. These are, in general, the polycondensation products of terephthalic acid and glycols, notably ethylene glycol, and are marketed under registered trademarks, such as "Terylene," "Diolen," "Dacron" and "Kodel."

Known dyeing methods are used. Polyester fibres can be exhaustion dyed in the presence of carriers at temperatures of about 80° C. to 125° C., or in the absence of carriers under pressure at about 100° C. to 140° C. These fibres can also be padded or printed with aqueous dispersions of the new dyes and the impregnations fixed at about 140° C. to 230° C., by means of, e.g., water vapour or hot air. In the optimum temperature range of 180° C. to 220° C. the dyes diffuse rapidly into polyester fibre and do not then sublime from it, even when exposed to these high temperatures for some length of time, which precludes inconvenient contamination of the dyeing equipment. Cellulose diacetate is dyed preferably at about 65° C. to 80° C. and cellulose triacetate at temperatures up to about 115° C. The optimum pH region for these fibres is 2 to 9 or more particularly 4 to 8.

In most cases the normal dispersants or a mixture of dispersants are used, preferably those of anionic or nonionic character. About 0.5 gram of dispersant per litre of the dyeing medium is often sufficient, though larger amounts up to about 3 grams per litre may be used. Amounts in excess of 5 grams do not usually offer any further advantage. Known anionic dispersants which can be used for the process are, for example, the condensation products of naphthalenesulphonic acids and formaldehyde, in particular dinaphthylmethane disulphonates, the esters of sulphonated succinic acid, Turkey red oil, soaps, the alkaline salts of the sulphuric acid esters of fatty alcohols, e.g. sodium lauryl sulphate, sodium cetyl sulphate, sulphite cellulose lye or its alkaline salts, and the alkaline sulphates of the monoglycerides of fatty acids. Examples of known and very suitable nonionic dispersants are the adducts of approximately 3–40 moles of ethylene oxide on alkylphenols, fatty alcohols of fatty amines, and their natural sulphuric acid esters.

In padding and printing methods of application the usual thickening agents are used, for example modified or unmodified natural products, such as crystal gum, locust bean gum, gum tragacanth, starches, carboxymethyl cellulose and hydroxymethyl cellulose, or synthetic products, such as polyacrylamides or polyvinyl alcohol.

The dyeings obtained are extremely fast to heat, i.e. to sublimation, thermofixation and pleating, and to burnt gas fumes, cross dyeing, dry cleaning, chlorine, and wet treatments, such as water, washing and perspiration. They show good dischargeability and a good reserve of wool and cotton. The light fastness is outstandingly good, even in pale shades, and consequently the new dyes are very suitable as components for the production of pastel fashion shades. They withstand boiling and reducing influences at temperatures up to at least 220° C. and particularly in the range 80–140° C. This temperature stability is not adversely affected by the presence of dyeing accelerants. Being highly resistant to sublimation, the dyes are highly suitable for application to fabrics which are submitted to a permanent press finishing process in the later course of production.

In the following examples the parts and percentages are by weight and the temperatures in degrees centigrade.

EXAMPLE 1

6.9 parts of sodium nitrite are added slowly with vigorous stirring to 120 parts of concentrated sulphuric acid at 60–70°. Stirring is continued for 10 minutes at 60°, after which the solution is cooled to 10°. At this temperature 16.3 parts of 2-amino-5-nitrobenzonitrile are added. In 3 hours diazotisation is complete. The sulphuric acid diazonium salt solution is run into a mixture of 30.4 parts of N-(2'-acetylamino-4'-methylsulphonylphenyl)-aminobenzene, 200 parts of glacial acetic acid, 150 parts of ice and 10 parts of aminosulphonic acid. The coupling reaction is brought to a close in acid medium by adjusting the pH to 2.0–2.5 with sodium acetate. The dye forms rapidly and settles out. It is filtered off, washed free of acid, dried, and recrystallised from dioxan. In the pure state it melts at 208–209° and gives dyeings of red shade on synthetic fibres which have excellent fastness properties.

EXAMPLE 2

To 120 parts of concentrated sulphuric acid at 60–70° are added with vigorous stirring 6.9 parts of powdered sodium nitrite. After stirring for a further 10 minutes at 60° and cooling to 10°, 100 parts of glacial acetic acid are added at 10–20°, followed by 20.7 parts of 1-amino-2,6-dichloro-4-nitrobenzene and 100 parts of glacial acetic acid. Stirring is continued for 2 hours at 10–15° and the resulting diazonium salt solution is then run into a mixture of 30.4 parts of N-(2'-acetylamino-4'-methylsulphonylphenyl)-aminobenzene, 200 parts of glacial acetic acid, 150 parts of ice and 10 parts of aminosulphonic acid. The coupling reaction is terminated in acid medium by adjusting with sodium acetate to pH 2.0–2.5. The dye forms instantaneously and settles out. It is filtered off, washed free of acid, dried, and recrystallised from a mixture of equal parts of alcohol and acetone. The pure dye melts at 223–224°. Its dyeings on synthetic fibres are of yellow-brown shade and have very good fastness properties.

EXAMPLE 3

17.2 parts of 1-amino-2-chloro-4-nitrobenzene are entered into a mixture of 60 parts of water and 40 parts of concentrated hydrochloric acid at room temperature and stirred for 3 hours. The resulting suspension is cooled by adding 100 parts of ice and at 0–5° the amine is diazotised in 2 hours with a solution of 6.9 parts of sodium nitrite in 100 parts of water. Stirring is continued for 15 minutes, after which 10 parts of aminosulphonic acid are added. The resulting diazonium salt solution is filtered clear, and to it is added a mixture of 30.4 parts of N - (2' - acetylamino - 4' - methylsulphonylphenyl) - aminobenzene and 200 parts of glacial acetic acid. The coupling reaction is completed in acid medium by adjusting the pH to 2.0–2.5 with sodium acetate. The dye forms rapidly and settles out. It is filtered off, washed free of acid, dried and recrystallised from a mixture of equal parts of ethanol and acetone. The pure dye melts at 202–203° and dyes synthetic fibres in scarlet shades with very good fastness properties.

EXAMPLE 4

6.9 parts of sodium nitrite are added slowly with vigorous stirrings to 120 parts of concentrated sulphuric acid at 60–70°. After stirring for a further 10 minutes at 60° and cooling to 10°, 20.7 parts of 1-amino-2,6-dichloro-4-nitrobenzene are added. Diazotisation takes 3 hours to complete. Subsequently, 8 parts of urea are added, the diazonium salt solution is stirred for a further 15 minutes at 10° and is then run into a mixture of 30.5 parts of N - (2' - acetylamino - 4' - aminosulphonylphenyl)-aminobenzene, 300 parts of glacial acetic acid and 150 parts of ice. The coupling reaction is brought to a close in acid medium by adjusting the pH to 2.0–2.5 with sodium acetate. The dye forms rapidly and settles out; it is filtered off, washed free of acid, dried and recrystallised from chlorobenzene. In the pure state it melts at 244–248°. The dyeings it gives on synthetic fibres are of yellow-brown shade and have very good fastness properties.

EXAMPLE 5

To 120 parts of concentrated sulphuric acid are added slowly at 60–70° with thorough stirring 6.9 parts of sodium nitrite, after which stirring is continued for 10 minutes at 60°, the solution cooled to 10° and then charged at this temperature with 20.7 parts of 1-amino-2,6-dichloro-4-nitrobenzene. In 3 hours diazotisation is complete. The resulting diazonium salt solution is allowed to flow into a mixture of 31.8 parts of N-(2'-propionylamino - 4' - methylsulphonylphenyl) - aminobenzene, 300 parts of glacia acetic acid, 150 parts of ice and 10 parts of aminosulphonic acid. Coupling is finalized in acid medium with a sodium acetate addition bringing the pH to 2.0–2.5. The dye forms rapidly and settles out, to be filtered off, washed free of acid, dried and recrystallised from a mixture of equal parts of alcohol and dioxan. The pure dye melts at 211–214°. It dyes synthetic fibres in yellow-brown shades with very good fastness properties.

EXAMPLE 6

6.9 parts of powdered sodium nitrite are added at 60–70° with vigorous stirring to 120 parts of concentrated sulphuric acid, with subsequent stirring for 10 minutes at 60°. After cooling to 10°, 20.7 parts of 1-amino-2,6-dichloro-4-nitrobenzene are added, and after further stirring for 2 hours at 10° the resulting diazonium salt solution is run into a mixture of 26 parts of N-(2'-acetylamino-4'-chlorophenyl)-aminobenzene, 300 parts of glacial acid, 150 parts of ice and 10 parts of aminosulphonic acid. The coupling reaction is brought to an end in acid medium. The dye forms rapidly and settles out. It is filtered off, washed free of acid, and dried. On synthetic fibres the pure dye gives dyeings of yellow-brown shade with excellent fastness properties.

DYEING EXAMPLE 1

A mixture of 7 parts of the dye obtained as detailed in Example 1, 4 parts of sodium dinaphthylmethane disulphonate, 4 parts of sodium cetyl sulphate and 5 parts of sodium sulphate is ground in a ball mill for 48 hours to give a fine powder. Two parts of this powder are dispersed in 3000 parts of water containing 3 parts of a 30% solution of a highly sulphonated castor oil and 20 parts of an emulsion of a chlorinated benzene. A piece of "Dacron" (registered trademark) polyester fabric weighing 100 parts is entered into the dyebath at 20–25°, the temperature of the bath raised to 95–100° in 30 minutes and dyeing continued for 1 hour at this temperature. The fabric is then removed, rinsed, soaped for 15 minutes at 70° with a 0.1% solution of an alkylphenylpolyglycol ether, rinsed again and dried. A red dyeing with excellent fastness properties is obtained.

DYEING EXAMPLE 2

A mixture of 30 parts of the dye obtained by the procedure of Example 2, 40 parts of sodium dinaphthylmethanedisulphonate, 50 parts of sodium cetyl sulphate and 50 parts of anhydrous sodium sulphate is ground for 48 hours in a ball mill. A fine powder is obtained, 4 parts of which are dispersed in 1000 parts of water at 40–50°, and into this bath are entered 100 parts of a scoured fabric of "Terylene" (registered trademark) polyester fibre. The bath is raised slowly to 130° and the material dyed for about 1 hour at this temperature under pressure, after which it is removed, rinsed, soaped, rinsed again and dried. An outstandingly fast dyeing of yellow-brown shade is obtained.

DYEING EXAMPLE 3

A fine aqueous dispersion of 30 parts of the dye produced in accordance with Example 2, 70 parts of sodium dinaphthylmethanedisulphonate and 3 parts of sodium alginate is topped up with water to 1000 parts and well stirred. This liquor is padded on a polyester fabric at 20° and after intermediate air drying at 60–100° the dyeing is fixed by treatment in dry air at 230° for 60 seconds. Rinsing, soaping, a second rinse and drying complete the process. A level, yellow-brown dyeing with good fastness properties is obtained.

DYEING EXAMPLE 4

A fine dye powder is prepared by grinding a mixture of 15 parts of the dye of Example 1, 20 parts of sodium dinaphthylmethane disulphonate, 25 parts of sodium cetyl sulphate and 25 parts of anhydrous sodium sulphate in a ball mill for 48 hours. The dyebath is set with 5 parts of this powder in 4000 parts of water. 100 parts of a scoured fabric of "Arnel" (registered trademark) cellulose triacetate fibre are entered into it, the bath is raised slowly to 95–100° and the fabric dyed for 1 hour at this temperature. On removal it is rinsed, soaped for 15 minutes at 70° with a 0.1% solution of an alkyl phenolpolyglycolether, rinsed again and dried. The dyeing thus produced is of red shade and has good fastness properties.

DYEING EXAMPLE 5

A mixture of 7 parts of the dye produced as given in Example 1, 4 parts of sodium dinaphthylmethanedisulphonate, 4 parts of sodium cetyl sulphate and 5 parts of anhydrous sodium sulphate is ground in a ball mill for 48 hours to give a fine powder. 2 parts of the powder are dispersed in 3000 parts of water containing 3 parts of a 30% solution of a highly sulphonated castor oil. 100 parts of a cellulose diacetate fabric are entered into the bath at 20–25°, the bath is raised to 80–82° in about 30 minutes and dyeing continued for 1 hour at this temperature. Subsequently, the fabric is removed, rinsed, soaped, rinsed again and dried. A red dyeing with good fastness properties is obtained.

DYEING EXAMPLE 6

A mixture of 7 parts of the dye obtained according to Example 5, 13 parts of sulphite cellulose waste powder and 100 parts of water is ground in a ball mill to form a paste which is jet dried. 4 parts of the paste are dispersed in a small volume of water and the dispersion is run through a sieve into a bath of 4000 parts of water containing 4 parts of N-oleyl-N'-hydroxyethyl-N'-(3'-sulpho-2'-hydroxypropyl)ethylenediamine. 100 parts of nylon polyamide fibre are introduced into this bath at 20°, the bath is raised to 100° in 30 minutes and the fabric dyed for 1 hour at this temperature, with subsequent rinsing and drying. The resulting yellow-brown dyeing is level and has god fastness properties.

The dyes detailed in the following table are produced in accordance with the procedure of Example 1 from a diazotised amine of Formula II and a compound of Formula III or V. The constitution of the tabulated dyes corresponds to the general formula $$A-N=N-B-\underset{\underset{R_1}{|}}{N}-D$$

where in each instance the azo group is bound to the nuclei A and B in the 1-position and the nitrogen atom of the amino group to the nucleus B in 4-position and to the benzene nucleus D in the 1-position.

| Ex. No. | A | B | $R_1$ | D | Shade on polyester fibre |
|---|---|---|---|---|---|
| 7 | 2-bromo-4-nitrophenyl | —$C_6H_4$— | —H | 2-acetylamino-4-methylsulphonylphenyl | Scarlet. |
| 8 | 2,6-dibromo-4-nitrophenyl | —$C_6H_4$— | —H | 2-acetylamino-4-methylsulphonylphenyl | Yellow-brown. |
| 9 | 2-chloro-4-methylsulphonylphenyl | —$C_6H_4$— | —H | 2-acetylamino-4-methylsulphonylphenyl | Orange. |
| 10 | 2,4-dinitrophenyl | —$C_6H_4$— | —H | 2-acetylamino-4-methylsulphonylphenyl | Red. |
| 11 | 2,4-dinitro-6-bromophenyl | —$C_6H_4$— | —H | 2-acetylamino-4-methylsulphonylphenyl | Violet. |
| 12 | 2-chloro-4-nitrophenyl | —$C_6H_4$— | —H | 2-acetylamino-4-nitrophenyl | Scarlet. |
| 13 | 2-cyano-4-nitrophenyl | —$C_6H_4$— | —H | 2-acetylamino-4-nitrophenyl | Red. |
| 14 | 2-cyano-4-nitrophenyl | —$C_6H_4$— | —H | 2-propionylamino-4-nitrophenyl | Red. |
| 15 | 2,6-dichloro-4-nitrophenyl | —$C_6H_4$— | —H | 2-acetylamino-4-nitrophenyl | Yellow-brown. |
| 16 | 2,6-dibromo-4-nitrophenyl | —$C_6H_4$— | —H | 4-methylsulphonylphenyl | Do. |
| 17 | 2,6-dibromo-4-nitrophenyl | —$C_6H_4$— | —H | 2-methoxycarbonylamino-4-methylsulphonylphenyl | Scarlet. |
| 18 | 2-cyano-4-nitrophenyl | —$C_6H_4$— | —H | 2-methoxycarbonylamino-4-methylsulphonylphenyl | Red. |
| 19 | 2-cyano-4-nitro-6-bromophenyl | —$C_6H_4$— | —H | 2-methoxycarbonyl-amino-4-methylsulphonylphenyl | Rubine. |
| 20 | 4-(2'-chlorophenylazo)-3-methoxyphenyl | —$C_6H_4$— | —H | 2-acetylamino-4-methylsulphonylphenyl | Orange. |
| 21 | 2-cyano-4-nitrophenyl | —$C_6H_4$— | —H | 2-acetylamino-4-chlorophenyl | Red. |
| 22 | 2-cyano-4-nitrophenyl | —$C_6H_4$— | —H | 2-acetylamino-4-aminosulphonylphenyl | Red. |
| 23 | 2,6-dichloro-4-nitrophenyl | —$C_6H_4$— | —H | 2-acetylamino-4-aminocarbonylphenyl | Yellow-brown. |
| 24 | 2-chloro-4-nitro-6-bromophenyl | —$C_6H_4$— | —H | 2-acetylamino-4-methylaminocarbonylphenyl | Do. |
| 25 | 2,6-dichloro-4-nitrophenyl | —$C_6H_4$— | —H | 2-acetylamino-4-methylaminocarbonylphenyl | Do. |
| 26 | 2,4-dinitro-6-bromophenyl | —$C_6H_4$— | —H | 2-acetylamino-4-nitrophenyl | Violet. |
| 27 | 2-chloro-4-nitro-6-bromophenyl | —$C_6H_4$— | —H | 2-acetylamino-4-methylsulphonylphenyl | Yellow-brown. |
| 28 | 2-chloro-4-nitro-6-bromophenyl | —$C_6H_4$— | —H | 4-methylsulphonylphenyl | Do. |
| 29 | 2-chloro-4-nitro-6-bromophenyl | —$C_6H_4$— | —H | 2-acetylamino-4-aminocarbonylphenyl | Do. |
| 30 | 2,6-dichloro-4-nitrophenyl | —$C_6H_4$— | —H | 4-methylsulphonylphenyl | Do. |
| 31 | 2-trifluoromethyl-4-nitrophenyl | —$C_6H_4$— | —H | 2-acetylamino-4-nitrophenyl | Red. |
| 32 | 2-nitro-4-methylsulphonylphenyl | —$C_6H_4$— | β-propionyloxyethyl | 4-methylsulphonylphenyl | Red. |
| 33 | 2,6-dibromo-4-nitrophenyl | —$C_6H_4$— | —H | 2-acetylamino-4-aminocarbonylphenyl | Yellow-brown. |
| 34 | 2,6-dibromo-4-nitrophenyl | —$C_6H_4$— | —H | 2-acetylamino-4-methylaminocarbonylphenyl | Do. |
| 35 | 2,6-dibromo-4-nitrophenyl | —$C_6H_4$— | —H | 2-formylamino-4-methylsulphonylphenyl | Do. |
| 36 | 2,5-dichloro-4-nitrophenyl | —$C_6H_4$— | —H | 2-formylamino-4-methylsulphonylphenyl | Scarlet. |
| 37 | 2,6-dichloro-4-nitrophenyl | —$C_6H_4$— | —H | 2-propionylamino-4-methylsulphonylphenyl | Yellow-brown. |
| 38 | 2-chloro-5-methylsulphonylphenyl | —$C_6H_4$— | —H | 2-acetylamino-4-aminocarbonylphenyl | Orange. |
| 39 | 2-chloro-4-nitro-6-bromophenyl | —$C_6H_4$— | —H | 2-acetylamino-4-aminocarbonylphenyl | Yellow-brown. |
| 40 | 4-nitrophenyl | —$C_6H_4$— | —H | 2-acetylamino-4-aminosulphonylphenyl | Orange. |
| 41 | 2-methoxycarbonylphenyl | —$C_6H_4$— | —H | 2-chloro-4-methylsulphonylphenyl | Do. |
| 42 | 2-chloro-4-aminosulphonylphenyl | —$C_6H_4$— | —H | 4-chlorophenyl | Do. |
| 43 | 2-methylsulphonyl-4-chlorophenyl | —$C_6H_4$— | —H | 2-acetylamino-4-nitrophenyl | Do. |
| 44 | 3,5-dichloro-4-nitrophenyl | —$C_6H_4$— | —H | 2-acetylamino-4-nitrophenyl | Do. |
| 45 | 4-acetylaminophenyl | —$C_6H_4$— | —H | 2-methoxycarbonylamino-4-methylsulphonylphenyl | Do. |
| 46 | 2-chloro-4-nitro-5-methoxyphenyl | —$C_6H_4$— | —H | 2-acetylamino-4-nitrophenyl | Red. |
| 47 | 2,5-dicyanophenyl | —$C_6H_4$— | —H | 2-acetylamino-4-nitrophenyl | Orange. |
| 48 | 2-methoxycarbonyl-4-methylsulphonylphenyl | —$C_6H_4$— | —H | 2-acetylamino-4-methylsulphonylphenyl | Do. |
| 49 | 4-methylsulphonylnaphthyl | —$C_6H_4$— | —H | 2-acetylamino-4-nitrophenyl | Red. |
| 50 | 4-(4'-nitrophenylazo)-naphthyl | —$C_6H_4$— | —H | 2-acetylamino-4-methylsulphonylphenyl | Brown. |
| 51 | 4-(4'-chlorophenylazo)-3-methylphenyl | —$C_6H_4$— | —H | 4-methylsulphonylphenyl | Yellow-brown. |
| 52 | 2-cyano-4-nitrophenyl | —$C_6H_4$— | —H | 3-acetylamino-4-chlorophenyl | Reddish violet. |
| 53 | 2-cyano-4-nitro-6-chlorophenyl | —$C_6H_4$— | —H | 3-acetylamino-4-chlorophenyl | Violet. |
| 54 | 2,6-dichloro-4-nitrophenyl | —$C_6H_4$— | —H | 4-acetylphenyl | Yellow-brown. |
| 55 | 2-chloro-4-nitro-6-bromophenyl | —$C_6H_4$— | —H | 2-propionylamino-4-methylsulphonylphenyl | Do. |

| Ex. No. | A | B | R₁ | D | Shade on polyester fibre |
|---|---|---|---|---|---|
| 56 | 2-cyano-4-nitrophenyl | —C₆H₄— | —H | 2-acetylamino-4-chloromethylsulphonylphenyl | Red. |
| 57 | 2,4-dinitro-6-bromophenyl | —C₆H₄— | —H | 2-acetylamino-4-nitrophenyl | Violet. |
| 58 | 2-cyano-4-nitrophenyl | —C₆H₄— | —H | 2-acetylamino-4-bromo-5-acetylaminophenyl | Red. |
| 59 | 2-methoxy-4-nitrophenyl | —C₆H₄— | —H | 4-chlorophenyl | Red. |
| 60 | 2-methylsulphonyl-4-nitrophenyl | —C₆H₄— | —H | 2-acetylamino-4-chlorophenyl | Red. |
| 61 | 2,4-dicyanophenyl | —C₆H₄— | —H | 2-acetylamino-4-methylsulphonylphenyl | Scarlet. |
| 62 | 3,4-dicyanophenyl | —C₆H₄— | —H | 2-acetylamino-4-methylsulphonylphenyl | Orange. |
| 63 | 3-chloro-4-cyanophenyl | —C₆H₄— | —H | 2-methoxycarbonylamino-4-methylsulphonylphenyl | Do. |
| 64 | 4-(4'-hydroxyphenylazo)-phenyl | —C₆H₄— | —H | 2-acetylamino-4-methylsulphonylphenyl | Do. |
| 65 | 2-chloro-4-nitrophenyl | —C₆H₄— | —H | 2-formylamino-4-methylsulphonylphenyl | Scarlet. |
| 66 | 2,6-dichloro-4-nitrophenyl | —C₆H₄— | —H | 2-formylamino-methylsulphonylphenyl | Yellow-brown. |
| 67 | 2-chloro-4-nitro-6-bromophenyl | —C₆H₄— | —H | 2-formylamino-4-methylsulphonylphenyl | Do. |
| 68 | 2-cyano-4-nitrophenyl | —C₆H₄— | —H | 2-formylamino-4-methylsulphonylphenyl | Red. |
| 69 | 2-chloro-methylsulphonyl- | —C₆H₄— | —H | 2-formylamino-4-methylsulphonylphenyl | Orange. |
| 70 | 2,5-dichloro-4-methylsulphonylphenyl | —C₆H₄— | —H | 2-formylamino-4-methylsulphonylphenyl | Scarlet. |
| 71 | 2-nitro-4-methylsulphonylphenyl | —C₆H₄— | —H | 2-formylamino-4-methylsulphonylphenyl | Red. |
| 72 | 2-methylsulphonyl-4-nitrophenyl | —C₆H₄— | —H | 2-formylamino-4-methylsulphonylphenyl | Red. |
| 73 | 2-chloro-4-nitro-6-methylsulphonylphenyl | —C₆H₄— | —H | 2-formylamino-4-nitrophenyl | Red. |
| 74 | 2-cyano-4-nitrophenyl | —C₆H₄— | —H | 4-nitrophenyl | Red. |
| 75 | 4-thiocyanophenyl | —C₆H₄— | —H | 2-methoxycarbonylamino-4-methylsulphonylphenyl | Orange. |
| 76 | 2-bromo-4-nitrophenyl | —C₆H₄— | —H | 2-β-chloroethoxycarbonylamino-4-methylsulphonylphenyl | Scarlet. |
| 77 | 2,5-dichloro-4-nitrophenyl | —C₆H₄— | —H | 2-acetylamino-4-methylsulphonylphenyl | Do. |
| 78 | 4-chloromethylsulphonylphenyl | —C₆H₄— | —H | 2-acetylamino-4-methylsulphonylphenyl | Orange. |
| 79 | 2,6-dichloro-4-nitrophenyl | —C₆H₄— | —H | 2-acetylamino-4-ethylsulphonylphenyl | Yellow-brown. |
| 80 | 2-chloro-4-nitro-6-bromophenyl | —C₆H₄— | —H | 2-acetylamino-4-ethylsulphonylphenyl | Do. |
| 81 | 2-chloro-4-nitro-6-bromophenyl | —C₆H₄— | —H | 2-methoxycarbonylamino-4-methylsulphonylphenyl | Do. |
| 82 | 2,6-dichloro-4-nitrophenyl | —C₆H₄— | —H | 2-methoxycarbonylamino-4-methylsulphonylphenyl | Do. |
| 83 | 2-cyano-4-nitrophenyl | —C₆H₄— | —H | 2-methoxycarbonylamino-4-methylsulphonylphenyl | Red. |
| 84 | 2,6-dichloro-4-nitrophenyl | —C₆H₄— | —H | 2-propionylamino-4-aminosulphonylphenyl | Yellow-brown. |
| 85 | 2,4-dinitro-6-cyanophenyl | —C₆H₄— | —H | 2-propionylamino-4-aminosulphonylphenyl | Violet. |
| 86 | 2,4-dicyanophenyl | —C₆H₄— | —H | 2-formylamino-4-trifluoromethylphenyl | Scarlet. |
| 87 | 2,6-dichloro-4-nitrophenyl | —C₆H₄— | —H | 2-acetylamino-4-trifluoromethylphenyl | Yellow-brown. |
| 88 | 2-chloro-4-nitrophenyl | 2-methylphenylene | —H | 4-trifluoromethylphenyl | Red. |
| 89 | 2,4-dinitro-6-bromophenyl | —C₆H₄— | —H | 4-trifluoromethylphenyl | Violet. |
| 90 | 2,4-dinitro-6-cyanophenyl | —C₆H₄— | —H | 3-bromo-4-methoxycarbonyloxyphenyl | Do. |
| 91 | 2-cyano-4-nitrophenyl | —C₆H₄— | —H | 2-acetylamino-4-methylaminosulphonylphenyl | Red. |
| 92 | 2,6-dichloro-4-nitrophenyl | —C₆H₄— | —H | 4-phenylsulphonylphenyl | Yellow-brown. |
| 93 | 2-chloro-4-methylsulphonylphenyl | —C₆H₄— | —H | 2-methyl-4-ethoxycarbonylphenyl | Orange. |
| 94 | 2-chloro-4-nitrophenyl | —C₆H₄— | —H | 3-ethoxycarbonyl-4-nitrophenyl | Scarlet. |
| 95 | 2-cyano-4-nitrophenyl | —C₆H₄— | —H | 2-acetylamino-4-cyanophenyl | Red. |
| 96 | 2-cyano-4-nitrophenyl | —C₆H₄— | —H | 4-cyanophenyl | Red. |
| 97 | 2-methylsulphonyl-4-nitrophenyl | —C₆H₄— | —H | 3,4-dicyanophenyl | Red. |
| 98 | 2-nitro-4-methylsulphonylphenyl | —C₆H₄— | —H | 2-acetylamino-4-cyanophenyl | Red. |
| 99 | 2,6-dibromo-4-nitrophenyl | —C₆H₄— | —H | 2-methoxycarbonyl-amino-4-cyanophenyl | Yellow-brown. |
| 100 | 2-cyano-4-nitrophenyl | —C₆H₄— | —H | 4-acetylphenyl | Red. |
| 101 | 2-cyano-4-nitrophenyl | —C₆H₄— | —H | 2-acetylamino-4-acetylphenyl | Red. |
| 102 | 2-chloro-4-nitrophenyl | —C₆H₄— | —H | 2-acetylamino-4-acetylphenyl | Scarlet. |
| 103 | 2-cyano-4-nitrophenyl | —C₆H₄— | —H | 3-nitrophenyl | Red. |
| 104 | 4-(4'-chlorophenylazo)-methylphenyl | 2-methyl-5-methoxyphenylene | —H | 4-cyanophenyl | Brown. |
| 105 | 4-(2'-chlorophenylazo)-3-methoxyphenyl | —C₆H₄— | —H | 2-acetylamino-4-trifluoromethylphenyl | Orange. |
| 106 | 4-(4'-chlorophenylazo)-3-methoxyphenyl | —C₆H₄— | —H | 4-methylsulphonylphenyl | Brown. |
| 107 | 2-cyano-4-nitrophenyl | —C₆H₄— | —H | 2-methoxy-4-chlorophenyl | Rubine. |
| 108 | 2-cyano-4-nitrophenyl | —C₆H₄— | —H | 3-cyano-4-methoxycarbonyloxyphenyl | Red. |
| 109 | 2,6-dichloro-4-nitrophenyl | —C₆H₄— | —H | 3-methoxycarbonyloxy-4-cyanophenyl | Yellow-brown. |
| 110 | 2,6-dichloro-4-nitrophenyl | —C₆H₄— | —H | 3-ethoxycarbonyloxy-4-nitrophenyl | Do. |
| 111 | 2,6-dichloro-4-nitrophenyl | —C₆H₄— | —H | 4-methoxycarbonyloxyphenyl | Do. |
| 112 | 2,6-dichloro-4-nitrophenyl | —C₆H₄— | —H | 4-ethoxycarbonyloxyphenyl | Do. |
| 113 | 2,6-dichloro-4-nitrophenyl | —C₆H₄— | —H | 4-propyloxycarbonyloxyphenyl | Do. |
| 114 | 2-cyano-4-nitrophenyl | —C₆H₄— | —H | 4-ethoxycarbonyloxyphenyl | Red. |
| 115 | 2-cyano-4-nitrophenyl | —C₆H₄— | —H | 3-chloro-4-methoxycarbonyloxyphenyl | Red. |
| 116 | 2-methylsulphonyl-4-nitrophenyl | —C₆H₄— | —H | 3-ethoxycarbonyloxy-4-chlorophenyl | Rubine. |
| 117 | 2,6-dibromo-4-nitrophenyl | —C₆H₄— | —H | 3-chloro-5-methoxycarbonyloxyphenyl | Yellow-brown. |
| 118 | 2-cyano-4-nitrophenyl | —C₆H₄— | —H | 3-chloro-5-methoxycarbonyloxyphenyl | Red. |
| 119 | 2-cyano-4-nitrophenyl | —C₆H₄— | —H | 4-acetoxyphenyl | Red. |

| Ex. No. | A | B | R₁ | D | Shade on polyester fibre |
|---|---|---|---|---|---|
| 120 | 2-methylsulphonyl-4-nitrophenyl | —C₆H₄— | —H | 4-nitrophenyl | Red. |
| 121 | 2-chloro-4-methylsulphonylphenyl | —C₆H₄— | —H | 4-nitrophenyl | Orange. |
| 122 | 2-chloro-4-amenosulphonylphenyl | —C₆H₄— | —H | 4-nitrophenyl | Do. |
| 123 | 2-chloro-4-methylaminosulphonylphenyl | —C₆H₄— | —H | 4-nitrophenyl | Do. |
| 124 | 2-chloro-4-dimethylaminosulphonylphenyl | —C₆H₄— | —H | 4-nitrophenyl | Do. |
| 125 | 2-chloro-4-dimethylaminosulphonylphenyl | —C₆H₄— | —H | 2-acetylamino-4-nitrophenyl | Do. |
| 126 | 2-chloro-4-methylaminosulphonylphenyl | —C₆H₄— | —H | 2-acetylamino-4-nitrophenyl | Do. |
| 127 | 2-chloro-4-aminosulphonylphenyl | —C₆H₄— | —H | 2-acetylamino-4-nitrophenyl | Do. |
| 128 | 2-chloro-4-methylsulphonylphenyl | —C₆H₄— | —H | 2-acetylamino-4-nitrophenyl | Do. |
| 129 | 2-methylsulphonyl-4-nitrophenyl | —C₆H₄— | —H | 2-acetylamino-4-nitrophenyl | Red. |
| 130 | 2-methylsulphonyl-4-nitrophenyl | —C₆H₄— | —H | 2-propionylamino-4-nitrophenyl | Red. |
| 131 | 2-methylsulphonyl-4-nitrophenyl | —C₆H₄— | —H | 2-propionylamino-4-chlorophenyl | Red. |
| 132 | 2,6-dichloro-4-nitrophenyl | —C₆H₄— | —CH₂CH₂OH | 4-nitrophenyl | Yellow-brown. |
| 133 | 2,6-dichloro-4-nitrophenyl | —C₆H₄— | —CH₂CH₂OCOCH₃ | 4-nitrophenyl | Do. |
| 134 | 2,6-dichloro-4-nitrophenyl | 2-methylphenylene | —H | 4-nitrophenyl | Do. |
| 135 | 2,6-dichloro-4-nitrophenyl | 2-methoxyphenylene | —H | 4-nitrophenyl | Do. |
| 136 | 2,6-dichloro-4-nitrophenyl | 2-acetylaminophenylene | —H | 4-nitrophenyl | Do. |
| 137 | 2,6-dichloro-4-nitrophenyl | 2-methylphenylene | —CH₂CH₂OH | 4-nitrophenyl | Do. |
| 138 | 2-methylsulphonyl-4-nitrophenyl | 2-methylphenylene | —H | 4-nitrophenyl | Violet. |
| 139 | 2-cyano-4-nitrophenyl | 2-methylphenylene | —CH₂CH₂OH | 4-nitrophenyl | Do. |
| 140 | 2-cyano-4-nitrophenyl | 2-methylphenylene | —CH₂CH₂OCOCH₃ | 4-nitrophenyl | Do. |
| 141 | 2-cyano-4-nitrophenyl | 2-methylphenylene | —CH₂CH₂COOCH₃ | 4-nitrophenyl | Do. |
| 142 | 2-cyano-4-nitrophenyl | —C₆H₅— | —CH₂CH₂COOCH₃ | 4-nitrophenyl | Rubine. |
| 143 | 2-cyano-4-nitrophenyl | —C₆H₅— | —CH₂CH₂COOCH₃ | 4-nitrophenyl | Do. |
| 144 | 2-cyano-4-nitrophenyl | —C₆H₄ | —CH₂CH₂OCOOCH₃ | 4-methylsulphonylphenyl | Do. |
| 145 | 2-cyano-4-nitrophenyl | 2-acetylaminophenylene | —H | 4-methylsulphonylphenyl | Violet. |
| 146 | 2-cyano-4-nitrophenyl | 2-methoxyphenylene | —H | 4-methylsulphonylphenyl | Do. |
| 147 | 2-cyano-4-nitrophenyl | 2,5-dimethoxyphenylene | —H | 4-methylsulphonylphenyl | Do. |
| 148 | 2-cyano-4-nitrophenyl | 2,5-dimethoxyphenylene | —CH₂CH₃ | 4-methylsulphonylphenyl | Do. |
| 149 | 2-methylsulphonyl-4-nitrophenyl | 2-methoxycarbonylaminophenylene | —H | 4-methylsulphonylphenyl | Do. |
| 150 | 2-chloro-4-nitrophenyl | 2-chloroacetylaminophenylene | —H | 4-nitrophenyl | Red. |
| 151 | 2-chloro-4-methylsulphonylphenyl | 2-methylphenylene | —CH₃CH₂CN | 4-nitrophenyl | Orange. |
| 152 | 2-chloro-4-methylsulphonylphenyl | 2-methylphenylene | —CH₂CH₂Cl | 4-nitrophenyl | Do. |
| 153 | 2-chloro-4-methylsulphonylphenyl | —C₆H₄— | —CH₃ | 4-nitrophenyl | Do. |
| 154 | 2,4-dinitrophenyl | —C₆H₄— | —CH₂CH₂OCHO | 4-nitrophenyl | Violet. |
| 155 | 2,4-dicyanophenyl | 2-methylphenylene | —CH₂CH₂OCOOCH₂CH₃ | 4-nitrophenyl | Do. |
| 156 | 2-chloro-4-nitro-6-cyanophenyl | 2-acetylamino-5-ethoxyphenylene | —H | 4-nitrophenyl | Blue. |
| 157 | 2,4-dinitro-6-bromophenyl | 2-acetylamino-5-ethoxyphenylene | —CH₂CH₂OCOCH₃ | 4-nitrophenyl | Do. |
| 158 | 2,4-dinitro-6-bromophenyl | 2-acetylamino-5-ethoxyphenylene | —CH₂CH₂OH | 4-nitrophenyl | Do. |
| 159 | 2,4-dinitro-6-bromophenyl | 2,5-dimethoxyphenylene | —H | 4-methylsulphonylphenyl | Violet. |
| 160 | 2-chloro-4-nitro-6-bromophenyl | —C₆H₄— | —H | 2-acetylamino-4-nitrophenyl | Yellow-brown. |
| 161 | 2,6-dibromo-4-nitrophenyl | —C₆H₄— | —H | 2-acetylamino-4-nitrophenyl | Do. |
| 162 | 2,6-dibromo-4-nitrophenyl | —C₆H₄— | —H | 2-propionylamino-4-nitrophenyl | Do. |
| 163 | 2-chloro-4-nitro-6-bromophenyl | —C₆H₄— | —H | 2-propionylamino-4-nitrophenyl | Do. |
| 164 | 2,6-dichloro-4-nitrophenyl | —C₆H₄— | —H | 2-propionylamino-4-nitrophenyl | Do. |
| 165 | 2,6-dichloro-4-nitrophenyl | —C₆H₄— | —H | 4-chlorophenyl | Do. |
| 166 | 2-chloro-4-nitro-6-bromophenyl | —C₆H₄— | —H | 4-chlorophenyl | Do. |
| 167 | 2,6-dibromo-4-nitrophenyl | —C₆H₄— | —H | 4-chlorophenyl | Do. |
| 168 | 2,6-dibromo-4-nitrophenyl | —C₆H₄— | —H | 4-nitrophenyl | Do. |
| 169 | 2-chloro-4-nitro-6-bromophenyl | —C₆H₄— | —H | 4-nitrophenyl | Do. |
| 170 | 2,6-dichloro-4-nitrophenyl | —C₆H₄— | —H | 4-nitrophenyl | Do. |
| 171 | 2-chloro-4-nitro-6-bromophenyl | —C₆H₄— | —H | 2-acetylamino-4-chlorophenyl | Do. |
| 172 | 2,6-dibromo-4-nitrophenyl | —C₆H₄— | —H | 2-acetylamino-4-chlorophenyl | Do. |
| 173 | 2,6-dibromo-4-nitrophenyl | —C₆H₄— | —H | 2-butyrylamino-4-methylsulphonylphenyl. | Do. |
| 174 | 2,6-dichloro-4-nitrophenyl | —C₆H₄— | —H | 2-butyrylamino-4-methylsulphonylphenyl. | Do. |
| 175 | 2-methylsulphonyl-4-nitrophenyl. | —C₆H₄— | —H | 2-acetylamino-4-cyanophenyl | Red. |
| 176 | 2-chloro-4-methylsulphonylphenyl. | —C₆H₄— | —H | 2-acetylamino-4-cyanophenyl | Orange. |
| 177 | 2-chloro-4-aminosulphonylphenyl. | —C₆H₄— | —H | 2-acetylamino-4-cyanophenyl | Do. |
| 178 | 2,6-dichloro-4-nitrophenyl | —C₆H₄— | —H | 2-acetylamino-4-chloromethylsulphonylphenyl. | Yellow-brown. |
| 179 | 2-chloro-4-nitro-6-bromophenyl | —C₆H₄— | —H | 2-acetylamino-4-chloromethylsulphonylphenyl. | Do. |
| 180 | 2,6-dibromo-4-nitrophenyl | —C₆H₄— | —H | 2-acetylamino-4-chloromethylsulphonylphenyl. | Do. |
| 181 | 2,6-dibromo-4-nitrophenyl | —C₆H₄— | —H | 2-propionylamino-4-methylsulphonylphenyl. | Do. |
| 182 | 2,6-dibromo-4-nitrophenyl | —C₆H₄— | —H | 2-acetylamino-4-ethylsulphonylphenyl. | Do. |
| 183 | 2,6-dibromo-4-nitrophenyl | —C₆H₄— | —H | 2-acetylamino-4-aminosulphonylphenyl. | Do. |
| 184 | 2-chloro-4-nitro-6-bromophenyl | —C₆H₄— | —H | 2-acetylamino-4-aminosulphonylphenyl. | Do. |
| 185 | 2-chloro-4-nitro-6-bromophenyl | —C₆H₄— | —H | 2-propionylamino-4-aminosulphonylphenyl. | Do. |
| 186 | 2,6-dibromo-4-nitrophenyl | —C₆H₄— | —H | 2-propionylamino-4-aminosulphonylphenyl. | Do. |

| Ex. No. | A | B | $R_1$ | D | Shade on polyester fibre |
|---|---|---|---|---|---|
| 187 | 2,6-dibromo-4-nitrophenyl | —C₆H₄— | —H | 2-acetylamino-4-methylamino-sulphonylphenyl. | Yellow-brown. |
| 188 | 2-chloro-4-nitro-6-bromophenyl | —C₆H₄— | —H | 2-acetylamino-4-methylamino-sulphonylphenyl. | Do. |
| 189 | 2,6-dichloro-4-nitrophenyl | —C₆H₄— | —H | 2-acetylamino-4-methylamino-sulphonylphenyl. | Do. |
| 190 | 2,6-dichloro-4-nitrophenyl | —C₆H₄— | —H | 2-propionylamino-4-methylamino-sulphonylphenyl. | Do. |
| 191 | 2,6-dibromo-4-nitrophenyl | —C₆H₄— | —H | 2-propionylamino-4-methylamino-sulphonylphenyl. | Do. |
| 192 | 2-chloro-4-methylamino-sulphonylphenyl. | —C₆H₄— | —H | 2-acetylamino-4-cyanophenyl | Orange. |
| 193 | 2-chloro-4-methylamino-sulphonylphenyl. | —C₆H₄— | —H | 2-acetylamino-4-chlorophenyl | Do. |
| 194 | 2-chloro-4-aminosulphonyl- | —C₆H₄— | —H | 2-acetylamino-4-chlorophenyl | Do. |
| 195 | 2-chloro-4-methylsulphonyl-phenyl. | —C₆H₄— | —H | 2-acetylamino-4-chlorophenyl | Do. |
| 196 | 2-bromo-4-methylsulphonyl-phenyl. | —C₆H₄— | —H | 2-acetylamino-4-chlorophenyl | Do. |
| 197 | 2-bromo-4-methylsulphonyl-phenyl. | —C₆H₄— | —H | 2-acetylamino-4-aminosulphonyl-phenyl. | Do. |
| 198 | 2-chloro-4-methylsulphonyl-phenyl. | —C₆H₄— | —H | 2-acetylamino-4-aminosulphonyl-phenyl. | Do. |
| 199 | 2-chloro-4-aminosulphonyl-phenyl. | —C₆H₄— | —H | 2-acetylamino-4-aminosulphonyl-phenyl. | Do. |
| 200 | 2-chloro-4-methylaminosul-phonylphenyl. | —C₆H₄— | —H | 2-acetylamino-4-aminosulphonyl-phenyl. | Do. |
| 201 | 2-methylsulphonyl-4-nitrophenyl. | —C₆H₄— | —H | 2-acetylamino-4-aminosulphonyl-phenyl. | Red. |
| 202 | 2-methylsulphonyl-4-nitrophenyl. | —C₆H₄— | —H | 2-acetylamino-4-methylamino-sulphonylphenyl. | Red. |
| 203 | 2-methylsulphonyl-4-chloro-phenyl. | —C₆H₄— | —H | 2-acetylamino-4-methylamino-sulphonylphenyl. | Orange. |
| 204 | 2-chloro-4-methylsulphonyl-phenyl. | —C₆H₄— | —H | 2-acetylamino-4-methylamino-sulphonylphenyl. | Do. |
| 205 | 2-chloro-4-aminosulphonyl-phenyl. | —C₆H₄— | —H | 2-acetylamino-4-methylamino-sulphonylphenyl. | Do. |
| 206 | 2-chloro-4-methylaminosul-phonylphenl. | —C₆H₄— | —H | 2-acetylamino-4-methylamino-sulphon lphen l. | Do. |
| 207 | 2-chloro-4-dimethylamino-sulphonylphenyl. | —C₆H₄— | —H | 2-acetylamino-4-methylamino-sulphonylphenyl. | Do. |
| 208 | 2,6-dichloro-4-nitrophenyl | —C₆H₄— | —H | 2-acetylamino-4-dimethylamino-sulphonylphenyl. | Yellow-brown. |
| 209 | 2-chloro-4-nitro-6-bromo-phenyl. | C₆H₄— | —H | 2-acetylamino-4-dimeth lamino-sulphonylphenyl. | Do. |
| 210 | 2,6-dibromo-4-nitrophenyl | —C₆H₄— | —H | 2-acetylamino-4-dimethylamino-sulphonylphenl. | Do. |
| 121 | 2,6-dibromo-4-nitrophenyl | —C₆H₄— | —H | 2-propionylamino-4-dimethylamino-sulphonylphenyl. | Do. |
| 212 | 2,6-dichloro-4-nitrophenyl | —C₆H₄— | —H | 2-propionylamino-4-dimethylamino-sulphonylphenyl. | Do. |
| 213 | 2,6-dichloro-4-nitrophenyl | —C₆H₄— | —H | 2-acetylamino-4-ethylaminosul-phonylphenyl. | Do. |
| 214 | 2-chloro-4-nitro-6-bromo-phenyl. | —C₆H₄— | —H | 2-acetylamino-4-ethylaminosul-phonylphenyl. | Do. Do. |
| 215 | 2,6-dibromo-4-nitrophenyl | —C₆H₄— | —H | 2-acetylamino-4-ethylaminosul-phonylphenyl. | Do. |
| 216 | 2,6-dibromo-4-nitrophenyl | —C₆H₄— | —H | 2-acetylamino-4-(3'-methoxy-propyl)-aminosulphonylphenyl. | Do. |
| 217 | 2-chloro-4-nitro-6-bromo-phenyl. | —C₆H₄— | —H | 2-acetylamino-4-(3'-methoxy-propyl)-aminosuphlonphenyl. | Do. |
| 218 | 2,6-dichloro-4-nitrophenyl | —C₆H₄— | —H | 2-acetylamino-4-(3'-methoxy-propyl)-aminosulphonylphenl. | Do. |
| 219 | 2,6-dichloro-4-nitrophenyl | —C₆H₄— | —H | 2-acetylamino-4-phenylamino-sulphonylphenyl. | Do. |
| 220 | 2,6-dichloro-4-nitrophenyl | —C₆H₄— | —H | 2-β-chloropropionylamino-4-methyl-sulphonylphenyl. | Do. |
| 221 | 2-chloro-4-nitro-6-bromo-phenyl. | —C₆H₄— | —H | 2-β-chloropropionylamino-4-methyl-sulphonylphenyl. | Do. |
| 222 | 2,6-dichloro-4-nitrophenyl | —C₆H₄— | H | 2-methyl-4-nitrophenyl | Do. |
| 223 | 2,6-dibromo-4-nitrophenyl | —C₆H₄— | H | 2-methyl-4-nitrophenyl | Do. |
| 224 | 2-chloro-4-nitro-6-bromo-phenyl. | —C₆H₄— | H | 2-methyl-4-nitrophejyl | Do. |
| 225 | 2,6-dichloro-4-nitrophenyl | —C₆H₄— | H | 2-chloro-4-nitrophenyl | Do. |
| 226 | 2,6-dichloro-4-nitrophenyl | —C₆H₄— | H | 2,4-dichlorophenyl | Do. |
| 227 | 2,6-dibromo-4-nitrophenyl | —C₆H₄— | H | 2,4-dichlorophenyl | Do. |
| 228 | 2,6-dibromo-4-nitrophenyl | —C₆H₄— | H | 2-methoxy-4-nitrophenyl | Do. |
| 229 | 2,6-dichloro-4-nitrophenyl | —C₆H₄— | H | 2-methoxy-4-nitrophenyl | Do. |
| 230 | 2,6-dichloro-4-nitrophenyl | —C₆H₄— | H | 2-chloro-4-methylsulphonylphenyl | Do. |
| 231 | 2,6-dibromo-4-nitrophenyl | —C₆H₄— | H | 2-chloro-4-methylsulphonylphenyl | Do. |
| 232 | 2,5-dichloro-4-nitrophenyl | —C₆H₄— | H | 4-diethylaminosulphonylphenyl | Orange. |
| 233 | 4-aminosulphonylnaphthyl | 2-propionylamino-phenylene | H | 4-ethylaminocarbonylphenyl | Do. |
| 234 | 4-acetylphenyl | 2-cyanophenylene | —CH₂CH₂OCOCH₃ | 4-dimethylaminocarbonylphenyl | Do. |
| 235 | 4-chlorophenyl | 2-ethoxycarbonyl-aminophenylene | —CH₂CH₂CH₃ | 4-diethylaminocarbonylphenyl | Do. |
| 236 | 2-chloro-4-dimethylamino-sulphonylphenyl | 2-nitrophenylene | H | 4-(3'-methoxy) propylamino-carbonylphenyl | Do. |
| 237 | 2,5-dichloro-4-dimethylamino-sulphonylphenyl | 2-acetylamino-5-ethoxyphenylene | H | 4-nitrophenyl | Do. |
| 238 | 2,6-dichloro-4-dimethylamino-sulphonylphenyl | —C₆H₄— | —CH₂CH₂CH₂CH₃ | 4-nitrophenyl | Yellow-brown. |
| 239 | 2,6-dichloro-4-dimethylamino-sulphonylphenyl | —C₆H₄— | H | 2-butyroylamino-4-methyl-sulphonylphenyl | Do. |
| 240 | 2,6-dichloro-4-dimethylamino-sulphonylphenyl | —C₆H₄— | —CH₂CH₂CH₂CH₃ | 2-acetylamino-4-cyanomethyl-sulphonylphenyl | Do. |
| 241 | 2,6-dichloro-4-diethylamino-sulphonylphenyl | —C₆H₄— | —CH₂CH₂CH₂CH₃ | 2-valeroylamino-4-β-hydroxy-ethylsulphonylphenyl | Do. |
| 242 | 2,6-dibromo-4-dimethylamino-sulphonylphenyl | —C₆H₄— | —CH₂CH₂CH₂CH₃ | 2-β-chloropropionylamino-4-nitro-phenyl | Do. |
| 243 | 2,6-dibromo-4-dimethylamino-sulphonylphenyl | —C₆H₄— | —CH₂CH₂CH₂CH₃ | 2-ethoxycarbonylamino-4-methyl-sulphonylphenyl | Do. |
| 244 | 4-formylphenyl | 2-methyl-5-chloro-phenylene | —CH₂CH₂CH₂CH₃ | 3-methoxy-4-nitrophenyl | Orange. |
| 245 | 2-chloro-4-cyanomethyl-sulphonylphenyl | —C₆H₄— | —CH₂—CH(OH)—CH₃ | 4-nitrophenyl | Do. |

| Ex. No. | A | B | $R_1$ | D | Shade on polyester |
|---|---|---|---|---|---|
| 246 | 2,6-dichloro-4-nitrophenyl | —$C_6H_4$— | H | 3-methyl-4-nitrophenyl | Yellow-brown. |
| 247 | 2,6-dichloro-4-nitrophenyl | 2-chlorophenylene | H | 3-chloro-4-nitrophenyl | Do. |
| 248 | 2,6-dichloro-4-nitrophenyl | 2,5-dichlorophenylene | H | 3-ethoxy-4-nitrophenyl | Do. |
| 249 | 2,6-dichloro-4-nitrophenyl | 2,5-dimethylphenylene | H | 2,5-dimethoxy-4-nitrophenyl | Do. |
| 250 | 2,6-dichloro-4-cyanophenyl | —$C_6H_4$— | H | 2-propionylamino-4-methylsulphonylphenyl | Do. |
| 251 | 2-bromo-6-chloro-4-methylsulphonylphenyl | —$C_6H_4$— | H | 2-propionylamino-4-methylsulphonylphenyl | Do. |
| 252 | 4-formylphenyl | 2-methyl-5-bromophenyl | H | 2-propionylamino-4-methylsulphonylphenyl | Orange. |

Formulae of representative dyes of the foregoing examples are as follows:

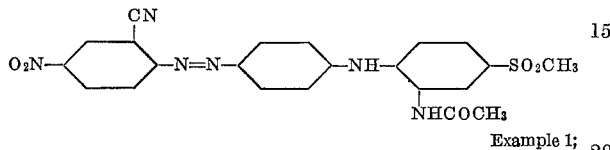

Example 1;

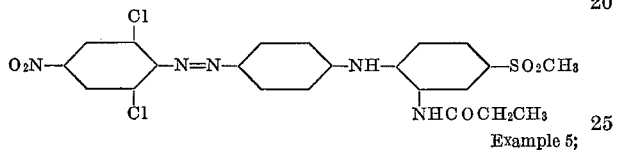

Example 5;

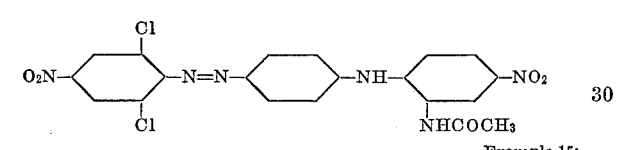

Example 15;

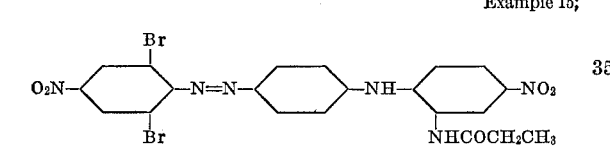

Example 162;

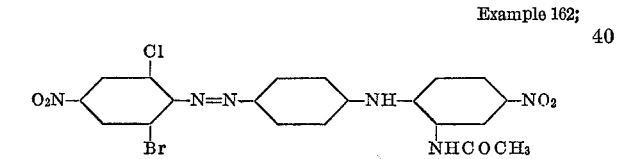

Example 160;

Having thus disclosed the invention what we claim is:
1. Disperse dye of the formula

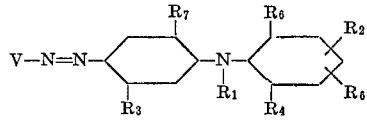

wherein V is free from metallizable groups and is of one of the formulae

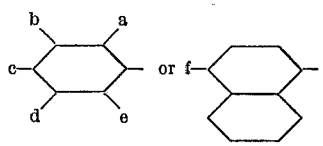

a is hydrogen, chlorine, bromine, cyano, nitro, trifluoromethyl, methoxy, methoxycarbonyl or methylsulphonyl;
b is hydrogen, chlorine, methyl or methoxy;
c is hydrogen, chlorine, cyano, thiocyano, nitro, formyl, acetyl, methylsulphonyl, cyanomethylsulphonyl, aminosulphonyl, methylaminosulphonyl, dimethylaminosulphonyl, ethylaminosulphonyl, diethylaminosulphonyl, acetylamino, phenylazo, 2-chlorophenylazo, 4-chlorophenylazo or 4-hydroxyphenylazo;
d is hydrogen, chlorine, cyano, methoxy or methylsulphonyl;
e is hydrogen, chlorine or bromine;
f is 4-nitrophenylazo, methylsulphonyl or aminosulphonyl;
$R_1$ is a member selected from the group consisting of hydrogen, alkyl and substituted alkyl, the alkyl having from 1 to 4 carbon atoms and any substituent of the substituted alkyl being a member selected from the group consisting of hydroxy, chloro, cyano, formyloxy, acetoxy, propionyloxy, methoxycarbonyl, methoxycarbonyl, methoxycarbonyloxy and ethoxycarbonyloxy;
$R_2$ is a member selected from the group consisting of halo, cyano, nitro, trifluoromethyl, alkylcarbonyl, alkoxycarbonyl, alkylcarbonyloxy, alkoxycarbonyloxy, alkylsulphonyl, phenylsulphonyl, carboxylic acid amide and sulphonic acid amide; each alkyl and each alkoxy having at most four carbon atoms; any alkyl substituent being a member selected from the group consisting of chloro, cyano and hydroxy; and any substituent on an amide nitrogen being a member selected from the group consisting of methyl, ethyl, phenyl and methoxypropyl;
$R_3$ is a member selected from the group consisting of hydrogen, halo, cyano, nitro, alkyl, alkoxy, chloralkylaminocarbonyl, alkylcarbonylamino and alkocarbonylamino; each alkyl and alkoxy having at most four carbon atoms;
$R_4$ is a member selected from the group consisting of hydrogen, halo, alkyl, alkoxy, formylamino, alkylcarbonylamino, alkoxycarbonylamino, phenoxycarbonylamino, alkylsulphonylamino and phenylsulphoneylamino; each alkyl and each alkoxy having at most four carbon atoms; and any substituent on an alkyl or alkoxy being a member selected from the group consisting of chloro and phenyl;
$R_5$ is a member selected from the group consisting of hydrogen, halo, cyano, nitro, alkyl, alkoxy, acyl, acylamino, carboxylic acid amide and sulphonic acid amide; each alkyl and each alkoxy having at most four carbon atoms; each acyl being a member selected from the group consisting of alkylcarbonyl, alkoxycarbonyl, methoxycarbonyloxy, ethoxycarbonyloxy, alkylsulphonyl and phenylsulphonyl; any substituent on the alkyl or alkoxy of an acyl being a member selected from the group consisting of chloro, cyano and hydroxy; and any substituent on an amide nitrogen being a member selected from the group consisting of methyl, ethyl, phenyl and methoxypropyl;
$R_6$ is hydrogen; and
$R_7$ is a member selected from the group consisting of hydrogen, halo, alkyl and alkoxy; the alkyl and alkoxy having at most four carbon atoms.

2. Dye according to claim 1 of the formula

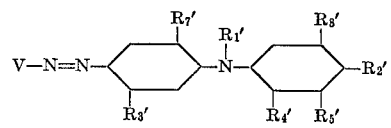

wherein V has the formula

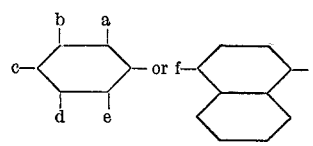

and $R'_1$ is hydrogen, alkyl or hydroxyalkyl having 1 to 4 carbon atoms, chlorethyl, cyanethyl, formyloxyethyl, acetoxyethyl, propionyloxyethyl, methoxycarbonylethyl, methoxycarbonyloxyethyl or ethoxycarbonyloxyethyl;

R'₂ is hydrogen, chlorine, bromine, cyano, trifluoromethyl, nitro, acetyl, acetoxy, methoxycarbonyl, ethoxycarbonyl, aminocarbonyl, methylaminocarbonyl, ethylaminocarbonyl, dimethylaminocarbonyl, diethylaminocarbonyl, methoxycarbonyloxy, ethoxycarbonyloxy, propoxycarbonyl, methoxypropylaminocarbonyl, methylsulphonyl, chloromethylsulphonyl, ethylsulphonyl, phenylsulphonyl, cyanomethylsulphonyl, hydroxyethylsulphonyl, aminosulphonyl, methylaminosulphonyl, dimethylaminosulphonyl, ethylaminosulphonyl, diethylaminosulphonyl, phenylaminosulphonyl or methoxypropylaminosulphonyl;

R'₃ is hydrogen, chlorine, bromine, cyano, nitro, methyl, methoxy, acetylamino, chloroacetylamino, propionylamino, methoxycarbonylamino or ethoxycarbonylamino;

R'₄ is hydrogen, chlorine, bromine, methyl, methoxy, formylamino, acetylamino, propionylamino, butyrylamino, valeroylamino, chloracetylamino, chloropropionylamino, methoxycarbonylamino, ethoxycarbonylamino, chloromethoxycarbonylamino or chloroethoxycarbonylamino;

R'₅ is hydrogen, chlorine, bromine, cyano, nitro, methyl, methoxy, ethoxy, acetylamino, methoxycarbonyl, ethoxycarbonyl, methoxycarbonyloxy or ethoxycarbonyloxy;

R'₇ is hydrogen, chlorine, bromine, methoxy or ethoxy;
R'₈ is hydrogen, chlorine, bromine or methoxy;
a is hydrogen, chlorine, bromine, cyano, nitro, trifluoromethyl, methoxy, methoxycarbonyl or methylsulphonyl;
b is hydrogen, chlorine, methyl or methoxy;
c is hydrogen, chlorine, cyano, thiocyano, nitro, formyl, acetyl, methylsulphonyl, cyanomethylsulphonyl, aminosulphonyl, methylaminosulphonyl, dimethylaminosulphonyl, ethylaminosulphonyl, diethylaminosulphonyl, acetylamino, phenylazo, 2-chlorophenylazo, 4-chlorophenylazo or 4-hydroxyphenylazo;
d is hydrogen, chlorine, cyano, methoxy or methylsulphonyl;
e is hydrogen, chlorine or bromine; and
f is 4-nitrophenylazo, methylsulphonyl or aminosulphonyl; with the proviso that R'₂, R'₅ and R'₈ do not each and at the same time signify hydrogen.

3. The dye according to claim 2 of the formula

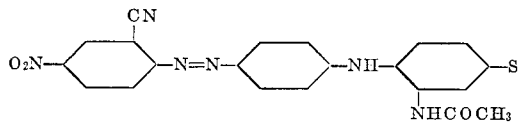

4. The dye according to claim 2 of the formula

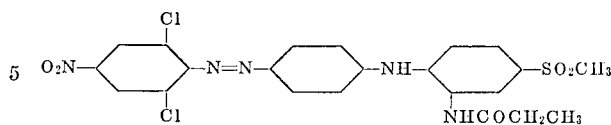

5. The dye according to claim 2 of the formula

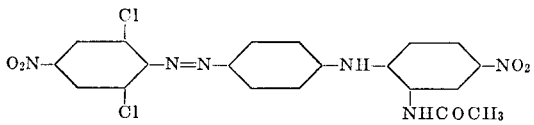

6. The dye according to claim 2 of the formula

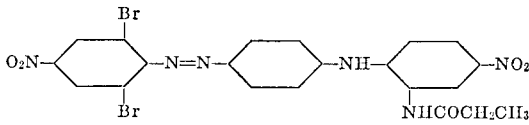

7. The dye according to claim 2 of the formula

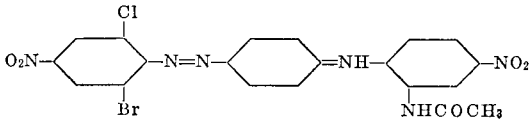

References Cited

UNITED STATES PATENTS

| | | | |
|---|---|---|---|
| 1,590,728 | 6/1926 | Dorrer | 260—205 |
| 1,734,246 | 11/1929 | Eichwede et al. | 260—207.1 XR |
| 1,905,294 | 4/1933 | Kalischer et al. | 260—162 XR |
| 2,077,322 | 4/1937 | Hatt | 260—205 XR |
| 2,117,745 | 5/1938 | Reddelien et al. | 260—207.1 XR |
| 2,177,427 | 10/1939 | Felix et al. | 260—206 |
| 2,289,349 | 7/1942 | Dickey et al. | 260—207.1 |
| 2,822,395 | 2/1958 | Dent | 260—205 XR |
| 3,153,034 | 10/1964 | Liechti | 260—205 |

FLOYD D. HIGEL, Primary Examiner

U.S. Cl. X.R.

8—4, 41, 50, 63, 71, 82; 117—138.8, 143, 260—37, 41, 186, 187, 196, 205, 206, 207, 207.5, 463, 465, 471, 482, 556, 558, 562, 576, 578

UNITED STATES PATENT OFFICE
CERTIFICATE OF CORRECTION

Patent No. 3,535,306   Dated October 20, 1970

Inventor(s) RUEDI ALTERMATT and HEINZ WICKI

It is certified that error appears in the above-identified patent and that said Letters Patent are hereby corrected as shown below:

Column 16, Example 206, "sulphon lphen l." should read --sulphonylphenyl.--; Example 209, "dimeth lamino-" should read --dimethylamino- --; Example 210, "sulphonylphenl." should read --sulphonylphenyl.--; Example 217, "aminosuphlon-phenyl." should read --aminosulphonylphenyl.--; Example 218, "aminosulphonyl-phenl." should read --aminosulphonylphenyl.--; Example 224, "nitrophejyl" should read --nitrophenyl--; Example 236, "methoxy) propylamino-" should read --methoxy)propylamino- --. Column 17, line 52, "$R_6$" should read --$R_5$--;

Column 18, lines 16 and 17, "methoxycarbonyl, methoxycarbonyl, methoxycarbonyloxy" should read --methoxycarbonyl, methoxycarbonyloxy--; line 30, "alkocarbonyl-" should read --alkoxycarbonyl- --; line 36, "phenylsulphoneylamino" should read --phenylsulphonylamino--; line 60, "$R_7$'" should read --$R'_7$--; "$R_8$'" should read --$R'_8$--; line 61, "$R_1$'" should read --$R'_1$--; line 62, "$R_2$'" should read --$R'_2$--; line 63, "$R_3$'" should read --$R'_3$--; "$R_4$'" should read --$R'_4$--; "$R_5$'" should read --$R'_5$--. Column 19, line 8, "propoxycarbonyl," should read --propoxycarbonyloxy,--; line 16, "chloroacetylamino," should read --chloracetylamino,--; line 23, "chloroethoxy-" should read --chlorethoxy- --. Column 20, claim 7, in the formula, "=NH-" should read -- -NH- --.

UNITED STATES PATENT OFFICE
CERTIFICATE OF CORRECTION

Patent No. 3,535,306                    Dated October 20, 1970

Inventor(s) RUEDI ALTERMATT and HEINZ WICKI

It is certified that error appears in the above-identified patent and that said Letters Patent are hereby corrected as shown below:

Column 2, line 33, "or" should read --of--; line 62, "sulphonylaminobenzene, 1-amino-4-aminosulphonylben-" should read --sulphonylaminobenzene, 1-amino-2-bromo-4-dimethylsulphonylphenylaminobenzene, 1-amino-4-aminosulphonylben- --. Column 3, line 37, "4-methylsulphonylphenyl)-" should read --4'-methylsulphonylphenyl)- --; line 56, "-aminobenzene," should read -- -aminobenzene, N-(2'-acetylamino-4'-aminocarbonylphenyl)-amonobenzene,--. Column 4, line 71, "R$_7$'" should read --R'$_7$--; "R$_8$'" should read --R'$_8$--; line 72, "R$_1$'" should read --R'$_1$--; line 73, "R$_2$'" should read --R'$_2$--; line 75 "R$_3$'" should read --R'$_3$--; "R$_4$'" should read --R'$_4$--; "R$_5$'" should read --R'$_5$--. Column 5, line 48, "hydrophobia" should read --hydrophobic--. Column 6, line 18, "of" should read --or--; line 19, "natural" should read --neutral--. Column 7, line 32, "stirrings" should read --stirring--; line 59, "glacia" should read --glacial--. Column 8, line 2, "cial acid," should read --cial acetic acid,--; line 56, "dinaphthylmethane disulphonate," should read --dinaphthylmethanedisulphonate,--.
Column 11, Example 69, "4-methylsulphonyl-" should read --4-methylsulphonylphenyl--. Column 12, Example 66, "-methylsulphonyl-" should read --4-methylsulphonyl- --; Example 80, "2-acetylzmino-" should read --2-acetylamino- --. Column 13, Example 122, "4-amenosulphonyl-" should read --4-aminosulphonyl- --; Example 148, "dimethoxyphenylenej" should read --dimethoxyphenylene--; Example 157, "ethoxy-phenylene" should read --ethoxyphenylene--. Column 14, Example 174, "methylsulphonyl-" should read --methylsulphonylphenyl--; Column 15, Example 194, "aminosulphonyl-" should read --aminosulphonylphenyl--; Example 206, "phonylphen 1." should read --phonylphenyl.--; Example 211, "121" should read --211--; Example 240, "-CH$_2$CH$_2$CH$_2$CH$_3$" should read --H--. Columns 15 and 16, immediately below Example 224, insert the following: --

224 ... 2-chloro-4-nitro-6-bromo-  -C$_6$H$_4$-  H  2-chloro-4-nitrophenyl  Do. --
      phenyl Column 10, line 4, "god" should read -- good --.

Signed and sealed this 12th day of September 1972.

(SEAL)
Attest:

EDWARD M. FLETCHER, JR.
Attesting Officer

ROBERT GOTTSCHALK
Commissioner of Patents